(12) United States Patent
Buus

(10) Patent No.: US 8,092,357 B1
(45) Date of Patent: Jan. 10, 2012

(54) SPINDLE GRIPPING DEVICE AND METHOD

(75) Inventor: Damon Buus, Durham, NC (US)

(73) Assignee: Honda Motor Co., Ltd., Tokyo (JP)

( * ) Notice: Subject to any disclaimer, the term of this patent is extended or adjusted under 35 U.S.C. 154(b) by 1047 days.

(21) Appl. No.: 11/965,213

(22) Filed: Dec. 27, 2007

(51) Int. Cl.
  *B23Q 3/157* (2006.01)
  *B23Q 3/155* (2006.01)
  *B23Q 7/04* (2006.01)
  *B23B 13/12* (2006.01)

(52) U.S. Cl. ............ 483/41; 483/16; 483/14; 483/901; 483/902; 294/115

(58) Field of Classification Search ............ 483/16, 483/31, 39, 40, 41, 901, 902, 14; 294/115, 294/88
See application file for complete search history.

(56) References Cited

U.S. PATENT DOCUMENTS

| 3,247,978 A | 4/1966 | Neumeier |
| 3,400,836 A | 9/1968 | Bende |
| 3,630,391 A | 12/1971 | Wilson |
| 3,771,669 A | 11/1973 | Maggioni |
| 4,090,287 A | 5/1978 | Selander |
| 4,555,844 A | 12/1985 | Palfery et al. |
| 4,571,814 A | 2/1986 | Palfery et al. |
| 4,612,697 A | 9/1986 | Palfery et al. |
| 4,636,135 A | 1/1987 | Bancon |
| 4,716,647 A | 1/1988 | Winkler et al. |
| 4,809,425 A | 3/1989 | Monforte |
| 4,897,014 A | 1/1990 | Tietze |
| 5,007,796 A | 4/1991 | Sticht |
| 5,775,755 A | 7/1998 | Covert et al. |
| 5,803,886 A | 9/1998 | Schweizer |
| 5,885,199 A | 3/1999 | Shao |
| 7,070,550 B1 * | 7/2006 | Sun .................... 483/39 |
| 7,103,955 B2 | 9/2006 | Murai et al. |
| 7,503,566 B2 * | 3/2009 | Martinis ................ 483/31 |
| 2007/0014648 A1 * | 1/2007 | Martinis ................ 409/232 |

FOREIGN PATENT DOCUMENTS

| JP | 09-029574 A | * | 2/1997 |
| JP | 2003-231034 A | * | 8/2003 |

OTHER PUBLICATIONS

Machine Translation of JP 09-029574, which JP '574 was published Feb. 1997.*
Machine Translation of JP '2003-231034, which JP '034 was published Aug. 2003.*

* cited by examiner

*Primary Examiner* — Erica E Cadugan
(74) *Attorney, Agent, or Firm* — Rankin Hill & Clark LLP

(57) ABSTRACT

A spindle gripping device and method for use in a CNC machine for re-orienting a workpiece. The gripping device includes an attachment portion, a translational driver, and a gripping portion. The attachment portion mechanically attaches the gripping device to a spindle of the CNC machine, and allows a transfer of the rotation of the spindle to the gripping device. The translational driver translates the input rotational force into a linear movement. The gripping portion uses the linear movement to open and close claws of the gripping device. A controller monitors and controls the operation of the CNC machine, so as to control an exchange of the working tool with the gripping device, and to control actuation and subsequent movement of the gripping device to reposition the workpiece into a desired orientation.

15 Claims, 4 Drawing Sheets

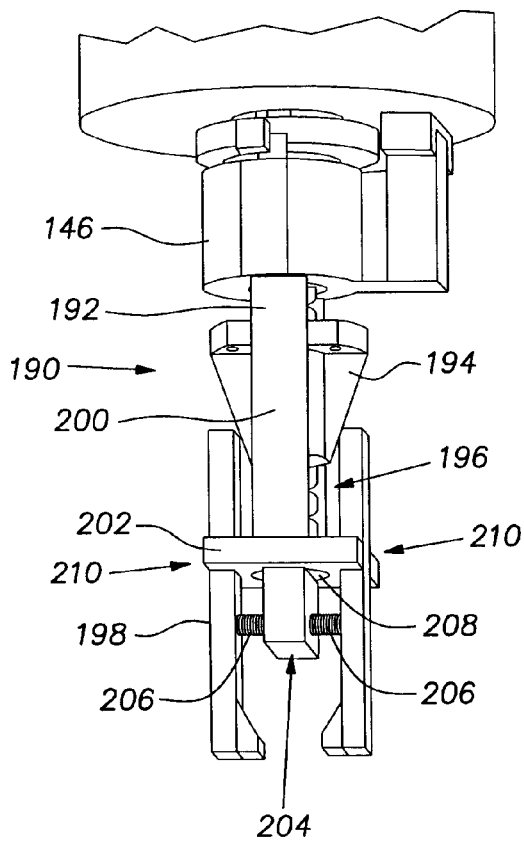
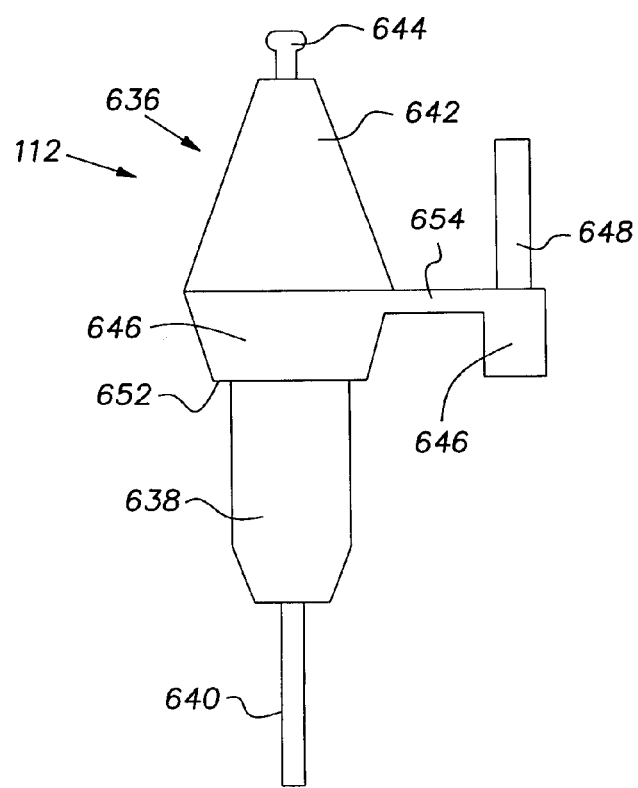

SPINDLE GRIPPING DEVICE AND METHOD

BACKGROUND OF THE INVENTION

In a manufacturing setting, Computer Numerical Control (CNC) machines are commonly used to precisely work components. Specifically, a computer controller drives a machine tool to perform a cutting operation within a work envelope of the machine. The use of CNC machines has resulted in considerable improvements in the consistency and quality of machined parts. Further, CNC automation has reduced the time required to change the machine to produce different components.

CNC machines are generally used for drilling or tapping operations, such as an operation of drilling holes into an engine block. A typical CNC machine will have a work envelope within which the cutting operation is performed, a mounting block for holding the part to be operated upon, a spindle which generates a rotational force, a work tool for performing the drilling function, and a controller for instructing machine operation. In operation, a workpiece is placed in the mounting block, which is inside of the work envelope. The spindle, which has a drilling work tool attached, is then moved by a driver, which is directed by the controller, to drill holes in the workpiece in the correct locations along the workpiece. Generally, the spindle can be moved along the X, Y, and Z axes. A typical workpiece, such as an engine block, has six surfaces. As the workpiece must be held by the positioning block along at least one surface, the held surfaces are not available to the drilling work tool. As such, if a workpiece requires all six surfaces to be worked, the workpiece must be removed from the positioning block and reset such that the positioning block holds the workpiece along a different surface. Further, as the spindle is generally held from the top of the work envelope, the drilling is optimally carried out on the top surface of the workpiece.

In addition to improving the quality of manufactured components, improving the efficiency of the manufacturing process is also desirable. In this regard, the present CNC drilling machine has drawbacks. Placing the workpiece into the positioning block, repositioning the workpiece during operation, and removing the workpiece upon conclusion of the machining operation all reduce the efficiency of the system. Presently, the loading, unloading, and repositioning of the workpiece requires either: manpower, a separate robot, or a gantry loader.

Each of the alternatives has advantages and drawbacks. Manpower is flexible, however is also relatively expensive and can make errors in handling parts. Robots are accurate, but expensive. Gantry loaders are also expensive and must be custom designed. Further, all of the above options require the machine to be stopped and the safety doors to be opened, which in turn requires extra safety circuits and interlock programming to ensure safety.

Accordingly, a need exists in the art for an improvement in the loading, unloading, and/or repositioning of workpieces in a CNC drilling machine.

SUMMARY OF THE INVENTION

The present invention is directed to an improved device and method for loading, unloading, and/or repositioning a workpiece within a CNC machine so as to improve manufacturing efficiency while minimizing the drawbacks of the above described alternatives.

According to the present invention, the CNC machine includes a spindle, a part mounting block, a work tool, a gripper tool, and an automatic tool changer. The automatic tool changer allows for the work tool and the gripper tool to be interchangeably attached and detached from the spindle, so that the CNC machine can work a surface of a workpiece, can pick up and reposition the workpiece, and can then work a different surface of the workpiece.

According to the gripper tool of the present invention, the gripper tool includes an attachment portion, a translational driving portion, and a gripping portion. The attachment portion is connected with the spindle and is rotated by the spindle. The translational driving portion translates the rotation into linear movement. The gripping portion uses the linear movement to open and close claws disposed on the gripping portion. A controller associated with the CNC machine directs the gripper tool so as to position the gripper tool on the workpiece and to instruct the opening and closing of the gripper claws by controlling the rotational speed and direction of the spindle.

According to another aspect of the present invention, the gripper tool is used to facilitate the overall assembly process by receiving a workpiece into the CNC machine and outputting a machined workpiece from the CNC machine.

BRIEF DESCRIPTION OF THE DRAWINGS

The present invention will be described in conjunction with the embodiment shown in the drawings. The drawings are representative of the present invention and are not meant to limit the scope of the present invention. Reference to the drawings in describing the invention is only meant to simplify the description.

FIG. 4B is a perspective view of the gripper tool according to an alternate embodiment of the present invention.

FIG. 5 illustrates a drill tool.

DETAILED DESCRIPTION OF THE INVENTION

Figure 1:
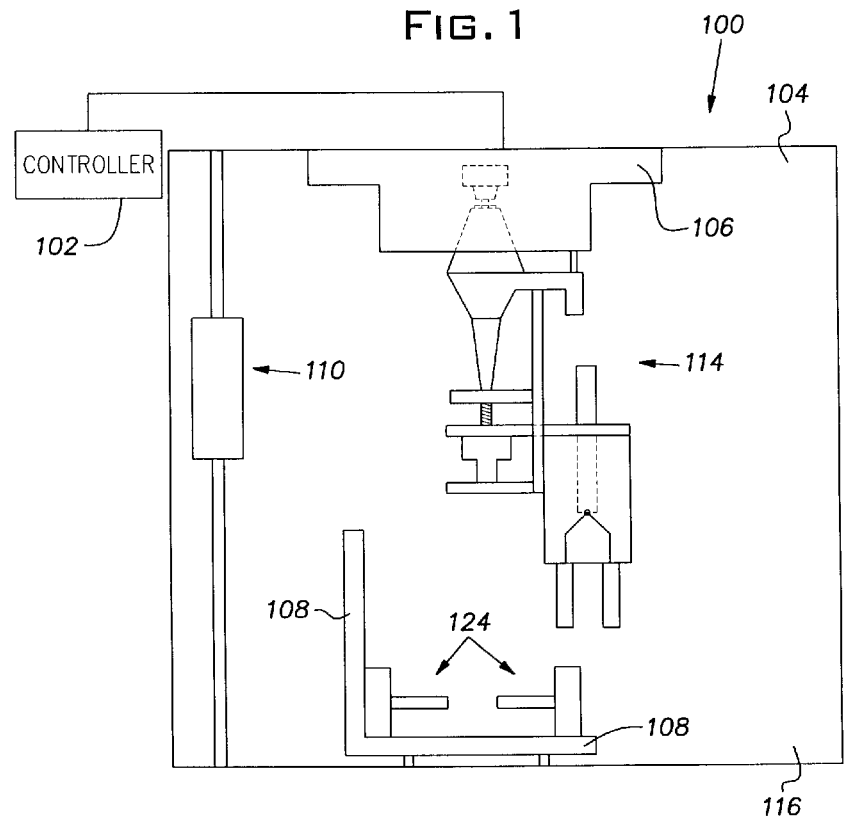
FIG. 1 schematically illustrates a CNC machine of the present invention.

With reference to FIG. 1, a CNC machine 100 includes a controller 102 and a work envelope 104. The work envelope 104 has a top wall, a bottom wall, and two side walls cooperating to form a generally rectangular space that is accessible from at least one side via a selectively openable safety door 116. The work envelope 104 receives a spindle 106, a part mounting block 108, an automatic tool changer 110, a drill tool 112, and a gripper tool 114. As the CNC machine 100 described herein performs a cutting or drilling operation, it is important that the walls of the work envelope 104 and the safety door 116 are made of a strong material which will prevent any metal shards from escaping the work envelope 104 during machining. The work envelope 104 further defines a communication means to allow the controller 102 to connect with the CNC machine 100 components disposed within the work envelope 104.

The controller 102 is connected with, and provides operating instructions to, the spindle 106, the automatic tool changer 110, and the part mounting block 108. The spindle 106 is mounted to the top wall of the work envelope 104 so as to be movable in the X, Y, and Z directions, as is known in the art. The spindle 106 is generally conventional, and is adapted to receive rotary tools, and will be described hereinafter relative to the drill tool 112 and the gripper tool 114. The part mounting block 108 is mounted generally centrally along the bottom wall of the work envelope 104. The automatic tool changer 110 is disposed to a side of the spindle 106 along a side or back wall of the work envelope 104. The automatic tool changer 110 is generally conventional, and is adapted to hold a plurality of rotary tools, including the drill tool 112 and the gripper tool 114. As will be appreciated by those skilled in the art, the automatic tool changer 110 is adapted to install and remove rotary tools, such as the drill tool 112 and the gripper tool 114, from the spindle 106.

As mentioned above, the spindle 106 is movably mounted along a top wall of the work envelope 104. As such, the spindle 106 can move so as to machine the top surface of the workpiece. The spindle 106 can be designed so as to have a swiveling head allowing the spindle 106 to work the side surfaces of the workpiece as well. However, it should be noted that since the workpiece must be mounted in the part mounting block 108, some surface of the workpiece will always be inaccessible.

Figure 2:
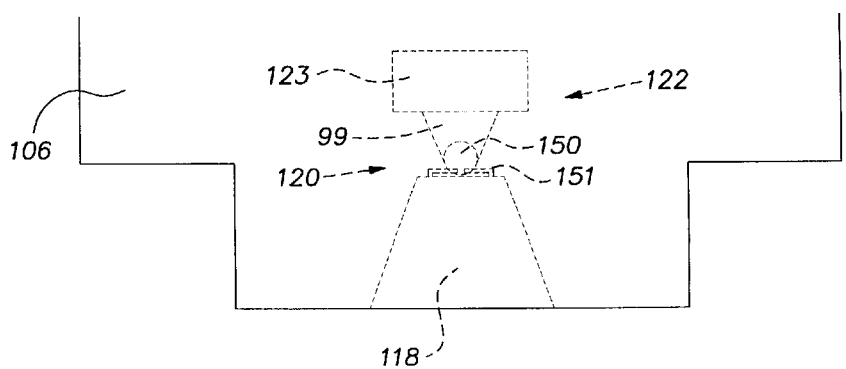
FIG. 2 schematically illustrates a spindle of the present invention.

With reference to FIG. 2, the spindle 106 is shown in more detail. Specifically, the spindle 106 further includes a tool opening 118, a connector 120, and a driver 122. The tool opening 118 is generally frustoconical in shape and extends laterally toward a center of the spindle 106. The connector 120 is disposed at the inner or small end of the tool opening 118 and includes a retention notch 150 and lever arms 151. The retention notch 150 is adapted to receive a retention knob 644, 144 associated with the work tools 112, 114. The lever arms 151 secure the retention knob 644, 144 within the retention notch 150. The secure reception of the retention knob 644, 144 within the retention notch 150 couples the work tool 112, 114 to the driver 122, as will be explained in more detail below.

The driver 122 includes a motor 123 and a driver cone 99. The motor 123 is drivingly attached to the driver cone 99. The retention notch 150 is defined as an opening on a bottom end of the driver cone 99, and the lever arms 151 extend through the driver cone 99. Thus, the retention knob 644, 144 is coupled to the driver cone 99, and is rotated by the rotation of the driver cone 99. As will be described below, the retention knob 644, 144 is integrally formed with the work tool 112, 114, such that as the retention knob 644, 144 is rotated, the work tool 112, 114 rotates integrally. It is noted that the spindle driving arrangement and the rotary connection between the spindle 106 and the work tool 112, 114, briefly described herein, is conventional and well known in the art.

With further reference to FIG. 1, the part mounting block 108 is shown in detail. The part mounting block 108 can take several different forms. As shown, the part mounting block 108 is a vise-type mount, wherein arms 124 extend and retract, thereby locking the workpiece in place and then releasing the workpiece. The part mounting block 108 can be movably mounted within the work envelope 104, so as to provide another axis of motion for the workpiece. As the part mounting block 108 is adapted to receive the workpiece, the part mounting block 108 may be specially fitted so as to receive a workpiece, or can be generally fitted to secure a broad variety of workpieces. It is believed that several mounting blocks are known in the art and may be used interchangeably with the present invention.

Figure 3:
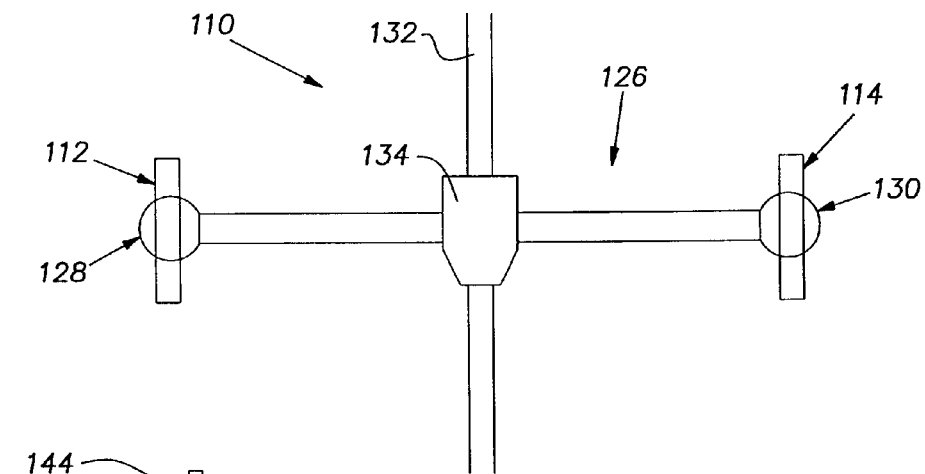
FIG. 3 schematically illustrates an automatic tool changer of the present invention.

With reference to FIG. 3, the automatic tool changer 110 is shown in more detail. The automatic tool changer 110 includes a rotating leg 126 with a drill tool arm 128 and a gripper tool arm 130 disposed on either end of the rotating leg 126. The rotating leg 126 rotates about a pivot post 132, which runs through an opening in the center of the rotating leg 126. The rotating leg 126 is driven by the automatic tool changer motor 134.

As shown in FIG. 3, the automatic tool changer 110 has the rotating leg 126 situated generally horizontally and the pivot post 132 situated generally vertically, so that the rotating leg 126 and the pivot post 132 intersect each other in a generally perpendicular manner. The rotating leg 126 can rotate about the pivot post 132 and can also slide along the pivot post 132. The changer motor 134 is adapted to move the rotating leg 126 up and down along the pivot post 132, as well as rotate the rotating leg 126 about the pivot post 132.

When idle, the rotating leg 126 is situated toward the top wall of the work envelope 104, so as to remain out of the way of the spindle 106 and the work tool 112, 114. When it is time for a tool change, the motor 134 drives the rotating leg 126 downward and rotates the empty arm 128, 130 toward the work tool 112, 114 attached to the spindle 106. The arm 128, 130 grips the corresponding work tool 112, 114. The controller 102 then instructs the lever arms 151 to release the retention knob 644, 144 of the work tool 112, 114. The work tool 112, 114 is thereby released from the attachment to the spindle 106 and the motor 134 drives the rotating leg 126 further downward so as to remove the work tool 112, 114 from the spindle 106. The motor 134 then rotates the rotating leg 126 so as to place the opposite arm 128, 130 below the spindle opening 118. The motor 134 then drives the rotating leg 126 upward, so as to place the retention knob 644, 144 of the work tool 112, 114 into the retention notch 150 within the opening 118 of the spindle 106. The controller 102 then directs the lever arms 151 to secure the retention knob 644, 144 to the retention notch 150, thereby coupling the work tool 112, 114 to the driver cone 99. The arm 128, 130 holding the tool 112, 114 then releases the tool 112, 114, and the motor 134 drives the rotating leg 126 back to the idle position. The connection and disconnection of the work tools 112, 114 with the spindle 106 will be discussed in further detail below.

Automatic tool changers for CNC machines are well known and can take many different forms. The above description of an automatic tool changer 110 is merely one such example of an automatic tool change device and method.

Figure 4A:
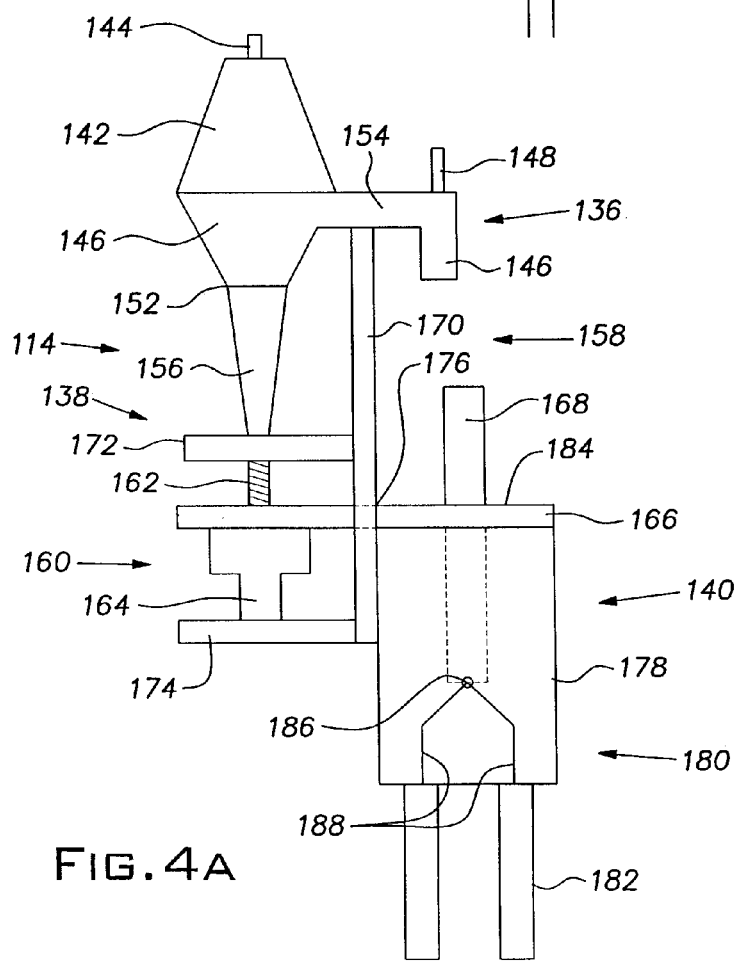
FIG. 4A schematically illustrates a gripper tool of the present invention.

With reference to FIGS. 4A, 4B, and 5, the work tools 112, 114 are shown in more detail. FIG. 4A shows a gripper tool 114 of the preferred embodiment, which includes an attachment portion 136, a driving portion 138, and a gripper portion 140.

The attachment portion 136 is comprised of a frustoconical head 142 with the retention knob 144 integrally formed on the top portion thereof, a non-rotary housing 146, and a positioning block 148. The frustoconical head 142 is sized and shaped to fit in the spindle opening 118. The retention knob 144, as mentioned above, is adapted to be received within the retention notch 150 in the spindle opening 118. The retention knob 144 fits through the opening of the retention notch 150, and is secured within the retention notch 150 by the lever arms 151. As described above, the retention notch 150 is the opening in the driver cone 99, the driver cone 99 being operably connected to the motor 123. Therefore, the connection of the retention knob 144 to the retention notch 150 defined in the driver cone 99, couples the frustoconical head 142 to the motor 123. As such, the rotation of the driver cone 99 is imparted to the frustoconical head 142.

The housing 146 includes an opening 152 and an extension 154. The opening 152 is adapted to receive the bottom portion of the frustoconical head 142 and the top portion of the gripper driving portion 138. The frustoconical head 142 and the gripper driving portion 138 are integrally formed with one another and, as a singular unit, extend through the opening 152. Therefore, the gripper driving portion 138 rotates with the frustoconical head 142.

The housing extension 154 extends horizontally from the portion of the housing 146 defining the opening 152, and supports the positioning block 148. The positioning block 148 extends upward from the housing extension 154 so as to connect to the spindle 106. The positioning block 148 connects to a non-rotary portion of the spindle 106, and through the connection, stabilizes and prevents rotation of the housing 146. Therefore, the housing 146 remains stationary as the frustoconical head 142 and the gripper driving portion 138 rotate within the opening 152.

The gripper driving portion 138 is integrally formed with a bottom end of the frustoconical head 142. The gripper driving portion 138 includes a driver 156, a frame 158, and a ball screw 160. The driver 156 is the gripper driving portion 138 component that is integrally formed with the bottom end of the frustoconical head 142 and extends through the opening 152 in the housing 146. The driver 156 rotates integrally with the frustoconical head 142. The ball screw 160 is integrally attached to a bottom end of the driver 156.

The ball screw 160 includes a threaded rod 162, a housing 164, an adapter 166, and a piston 168. The threaded rod 162 is attached to the driver 156 such that the threaded rod 162 rotates integrally with the driver 156. The housing 164 defines a threaded opening sized to threadably receive the threaded rod 162. The adapter 166 is connected to and extends horizontally from the housing 164 to support the piston 168. The piston 168 is supported by the adapter 166 so as to be generally perpendicular to the adapter 166 and is generally parallel with the axis of the driver 156.

The frame 158 includes a vertical support plate 170, an upper support plate 172, and a lower support plate 174. An upper end of the vertical support plate 170 is attached to the housing 146 and is thereby held in a stationary, non-rotary position. The upper support plate 172 and the lower support plate 174 are disposed horizontally and are attached to the vertical support plate 170. Thus, the arrangement of the frame 158 generally resembles an upside-down letter "F".

The upper support plate 172 and the lower support plate 174 each define circular openings with bearings disposed therein, the circular openings/bearings adapted to fit the threaded rod 162. The housing 164 is received between the upper and lower support plates 172, 174, which are spaced a distance from one another to allow the housing 164 a range of vertical movement so as to drive the gripper portion 140, as will be described in more detail below.

Further, the vertical support plate 170 defines an opening 176 that is positioned and sized so as to fit the adapter 166. Specifically, the adapter 166 is slidably received within the opening 176 so as to be movable only in the vertical direction as rotation of the threaded rod 162 moves the housing 164 vertically.

Figure 4C:
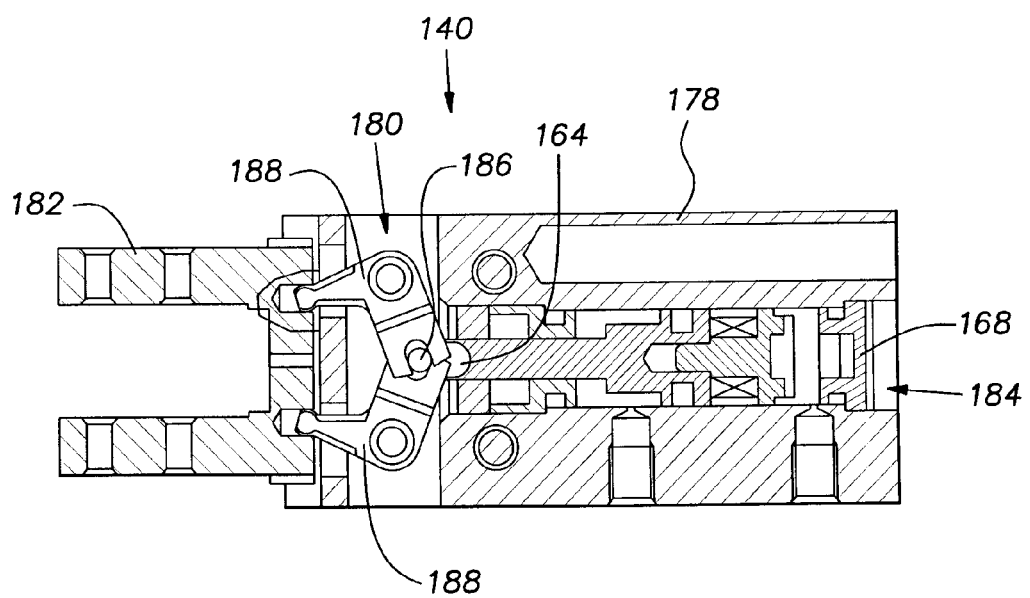
FIG. 4C schematically illustrates a sectional view of the gripper portion of the gripper tool of the present invention.

The gripper portion 140 is attached to a bottom end of the vertical support plate 170 of the frame 158, and is operably connected to the piston 168. With reference to FIG. 4C, the gripper portion 140 includes a gripper base 178, a gripper actuator 180, and gripper claws 182. The gripper base 178 is attached to the vertical support plate 170 and houses the gripper actuator 180.

A top end of the gripper base 178 defines a cylindrical opening 184 adapted to receive the piston 168. The gripper actuator 180 is disposed at a bottom end of the cylindrical opening 184 and is operably attached to the piston 168.

The gripper actuator 180 includes a pivot pin 186 and two elbows 188. The gripper actuator 180 is adapted to convert the linear motion of the piston 168 into transverse motion opening and closing the gripper claws 182. The pivot pin 186 is disposed along a central axis of the piston 168 and the cylindrical opening 184. Each of the elbows 188 has a bent portion, such that the elbows are generally L-shaped. Each elbow 188 connects with the pivot pin 186 at one end, with the far end connecting to one of the gripper claws 182. At the end of the elbows 188 which connects with the pivot pin 186, each elbow 188 is operably connected to the piston 168. In this regard, it is noted that the end of the elbows 188 connecting with the pivot pin 186 extends beyond the pivot pin 186 toward the piston 168. The piston 168 defines an inverted U-shaped end 164, so that each projection of the U shaped end 164 connects with one of the elbows 188.

As the piston 168 moves downwardly, the inverted U-shaped end 164 engages the upper ends of the elbows 188 such that the lower elbow ends, and the claws 182 secured thereto, move toward one another. Similarly, when the piston 168 moves upwardly, the elbows 188 rotate in an opposite direction whereby the claws 182 move away from one another.

In operation, rotation of the driver 156 causes the threaded rod 162 to rotate. Since the housing 164 threadably engages the rod 162 but cannot rotate, rotation of the threaded rod 162 within the housing 164 causes the housing 164 to move linearly (up or down). As the housing 164 moves vertically, the adapter 166 and the piston 168 move integrally with the housing 164. Thus, spindle rotation is translated into linear motion of the piston 168. Linear movement of the piston 168 drives the claws 182 to open and close, as described above.

With reference to FIG. 5, the drill tool 112 includes an attachment portion 636, a driving portion 638, and a drill 640. The attachment portion 636 has a frustoconical head 642 and a retention knob 644, and is attached to the spindle 106 in the same manner as the gripper tool 114. The drill tool 112 also includes a non-rotary housing 646 having an extension 654 supporting a positioning block 648, and is attached to the spindle 106 in the same manner as the corresponding components of the gripper tool 114. The non-rotary housing 646 defines a housing opening 652, through which the frustoconical head 642 is connected to a drill driving portion 638. The drill 640 is attached to a bottom end of the drill driving portion 638. As the spindle 106 rotates the frustoconical head 642, the drill driving portion 638 and the drill 640 rotate integrally with the frustoconical head 642 of the attachment portion 638. It is noted that the drill tool 112 is conventional and well known in the art.

Operation of the CNC machine 100 as a whole will now be explained with reference to the gripper tool 114 shown in FIG. 4A. Initially, the safety door 116 of the work envelope 104 is opened. The safety door 116 can be opened manually or by a separate automatic means, where the separate automatic means can be the controller 102 directing a motor (not shown) to open and close the safety door 116. Once the safety door 116 is open, a workpiece (not shown) is placed on the part mounting block 108. The workpiece can be placed on the part mounting block 108 manually, by the gripper tool 114 (the operation of the gripper tool 114 will be described in further detail below), or by an automated loader external to the CNC machine 100. Once the workpiece is placed on the part mounting block 108, the safety door 116 is closed. The controller 102 then instructs the mount arms 124 to extend and thereby securely grip the workpiece in the part mounting block 108.

Assuming the drill tool 112 is attached to the spindle 106, once the workpiece is secured in the part mounting block 108, the machining of the workpiece can begin. As mentioned above, the spindle 106 is movable in the X, Y, and Z directions. Thus, with the present embodiment, the drill tool 112 can drill anywhere on the two-dimensional top surface of the workpiece. The drill tool 112 is moved in the X and Y direction to the proper drilling locations, and then lowered in the Z direction toward and into the workpiece so as to drill a hole at the correct position to the correct depth. The spindle 106 movement is controlled by the controller 102.

The drill tool 112 can be utilized to drill as many holes as is necessary in the workpiece, with the instructions coming from the controller 102. Once the drill tool 112 has completed drilling the holes in the top surface of the workpiece, the workpiece must be repositioned prior to the drill tool 112 being able to drill holes on any other workpiece surface. It should be noted that with advancements in drill technology, modern drilling tools have heads which can pivot, and therefore operate on surfaces other than the top surface of the workpiece. However, so long as the workpiece is clamped in the work envelope 104, certain surfaces of the workpiece cannot be reachable by the drill tool 112. For the purpose of the present description, the drill tool 112 will be described as only operating on the top surface of the workpiece.

Once the drill tool 112 has completed the drilling operations, assuming it is necessary to drill holes on another surface of the workpiece, the workpiece must be reoriented in the part mounting block 108. This operation is performed by the gripper tool 114. To utilize the gripper tool 114, the automatic tool changer 110 must remove the drill tool 112 from the spindle 106 and install the gripper tool 114 in the spindle 106.

Upon completion of the drilling operations, the spindle 106 moves the drill tool 112 to the uppermost, central position within the work envelope 104. The controller 102 then instructs the automatic tool changer 110 to initiate the tool change. First, the rotating leg 126 is lowered along the pivot post 132 by the automatic tool changer motor 134 until the rotating leg 126 is in a vertical line with the drill tool 112. Then, the motor 134 rotates the drill tool arm 128 toward the drill tool 112 until the drill tool arm 128 contacts the drill tool 112. It is noted that, as the rotating leg 126 is divided in half by the pivot post 132, each half of the rotating leg 126 with the respective tool arm 128, 130 disposed thereon, should be a length allowing the arm 128, 130 to operably receive the corresponding tool when the rotating leg 126 rotates the arm 128, 130 toward the work tool. As such, the work tool 112, 114 and spindle 106 need not be disposed centrally within the work envelope 104 so long as the work tool is within the reach of one half of the length of the rotating leg 126.

When the drill tool arm 128 contacts the drill tool 112, the drill tool arm 128 securely grips the drill tool 112. At this point, the controller 102 instructs the lever arms 151 to release the retention knob 644. Then, the drill tool arm 128, together with the rotating leg 126, are moved in a downward direction by the automatic tool changer motor 134, releasing the drill tool 112 from the spindle 106. Specifically, the retention knob 644 is released from the retention notch 150 of the spindle 106. The drill tool 112 is then lowered by the rotating leg 126 so that the retention knob 644 is below the spindle opening 118.

The controller 102 then instructs the motor 134 to rotate the rotating leg 126 as to move the drill tool arm 128 away from the spindle 106, and move the gripper tool arm 130 to a position below the spindle 106 so that the retention knob 144 of the gripper tool 114 is directly below the retention notch 150 of the spindle 106. The motor 134 then moves the rotating leg 126 upward so that the frustoconical head 142 of the gripper tool 114 fits in the opening 118 of the spindle 106, until the retention knob 144 is received in the retention notch 150. The lever arms 151 are then instructed to secure the retention knob 144 in the retention notch 150, thereby connecting the gripper tool 114 with the driver cone 99. As such, the gripper tool 114 is installed and ready for gripping operation.

The controller 102 then directs the gripper tool 114 to grip the workpiece. Initially, the spindle 106 is instructed to rotate so as to rotate the threaded rod 162 to cause the ball screw housing 164 and the piston 168 to move upward relative to the gripper claws 182, opening the gripper claws 182. The controller 102 then instructs the gripper tool 114 to move to a gripping location on the workpiece by moving the spindle 106 to the corresponding point on the X, Y, and Z axes.

Once the gripper tool 114 is in position, the spindle 106 rotates the threaded rod 162, moving the ball screw housing 164 downwardly, causing the piston 168 to move downwardly, and forcing the gripper claws 182 to close to grip the workpiece. Once the workpiece is securely gripped by the gripper claws 182, the controller 102 instructs the mount arms 124 to release the workpiece and then instructs the spindle 106 to raise the gripper tool 114 and the workpiece. The spindle 106 then moves the gripper tool 114, which is holding the workpiece, and lowers the gripper tool 114, so as to flip the workpiece and thereby place the workpiece in the part mounting block 108 with a different surface exposed to be worked on. In many CNC machines 100, the part mounting block 108 is adapted to be movable along a fourth or fifth axis. When this is the case, the motion of the part mounting block 108 cooperates with the gripper tool 114 to assist in repositioning the workpiece. The mount arms 124 are then extended to lock the workpiece in position. The spindle 106 rotates the threaded rod 162 so as to move the ball screw housing 164 and the piston 168 upwardly, opening the claws 182, and thereby releasing the workpiece.

Then, to machine the newly exposed surface, the operation of exchanging the gripper tool 114 with the drill tool 112 is performed. The operation for this exchange is the same as for replacing the drill tool 112 with the gripper tool 114, except that the opposite arm 128, 130 of the rotating leg 126 is used to remove the gripper tool 114 and to install the drill tool 112. Once the drill tool 112 is installed, the controller 102 instructs the drilling operation on the newly exposed surface. The process of drilling, tool exchange, and manipulating the workpiece is repeated until work on all surfaces of the workpiece is completed. Each iteration follows the same general method described above. At the completion of the operations, the mount arms 124 retract, thereby allowing the workpiece to be removed from the work envelope 104.

With reference to FIG. 4B, an alternate embodiment for a gripper tool 190 is shown. Specifically, the gripper tool 190 includes a frame 192, a wedge 194, a threaded rod 196, and gripper claws 198. The frame 192 is attached to the non-rotary housing 146.

The frame 192 comprises two vertical plates 200, a horizontal plate 202, a spring mount 204, and biasing springs 206. The vertical plates 200 extend downwardly from the housing 146 so that broad faces of the vertical plates 200 face one another. The threaded rod 196 is connected with the attachment portion 136 in the same manner as the driver portion 138 is connected to the attachment portion 136 in the gripper tool 114 shown in FIG. 4A. The threaded rod 196 is disposed between the vertical plates 200 and extends parallel to the vertical plates 200, which connect to the horizontal plate 202. The horizontal plate 202 defines an opening 208 lined with bearings that rotatably receive the threaded rod 196. The spring mount 204 is attached to a bottom surface of the horizontal plate 202. A biasing spring 206 extends between each lateral face of the spring mount 204 and an associated claw 198.

The horizontal plate 202 also defines tabs 210 adapted to receive and support the claws 198 through a full range of claw 198 motion. The claws 198 are connected to the frame 192 via the spring mount 204 and the springs 206. The springs 206 bias the claws 198 toward a closed position.

The wedge 194 has tapered sides and defines a threaded opening through its center, so that the wedge 194 threadably receives the threaded rod 196. The wedge 194 is slidably received between the vertical plates 200, so that as the threaded rod 196 rotates, the wedge 194 moves in linearly, up or down. The wedge 194 is positioned so that as the wedge 194 is lowered, the tapered sides of the wedge 194 progressively engage and slide down the inner surface of the claws 198, driving the claws 198 open. As the wedge 194 is raised, the wedge 194 no longer forces the claws 198 away from one another, so that the biasing effect of the springs 206 causes the claws 198 to close.

It should be understood that other gripper variations can be used with the present invention. The gripping tools can take many different forms, and any gripping tool which is driven to perform the gripping function by the spindle rotation is considered to be within the scope of the present invention. Further, it should be understood that the gripper need not grip the workpiece by closing claws about a part of the workpiece. The gripper claws can also grip by entering a hole while together and then expanding to grip the workpiece by engaging the inner walls of the hole of the workpiece.

The gripper tool 114 defined in the present invention, in addition to manipulating the workpiece during operations, can be used in other ways to help improve overall system efficiency as well. Specifically, the gripper tool 114 can be integrated into a larger material flow operation. For the gripper tool 114 to facilitate such an operation, the gripper tool 114 is to be attached to the spindle 106 at the beginning of the operation and at the close of the operation. Specifically, the workpiece is to be delivered to the CNC machine 100 at the beginning of the operation. The controller 102 then instructs the opening of the safety door 116 and directs the spindle 106 to move the gripper tool 114 to the workpiece. The gripper tool 114 then grips the workpiece and carries the workpiece to the part mounting block 108. The workpiece is set in the part mounting block 108 so as to have the initial surface of the workpiece operated on by the drill tool 112. At the conclusion of working all surfaces of the workpiece, the gripper tool 114 is attached to the spindle 106. The gripper tool 114 then picks up the workpiece, the controller instructs the opening of the safety door 116, and the gripper tool 114 places the workpiece in an output carrier.

The carrier for bringing the workpiece to the CNC machine 100 and carrying the workpiece away from the CNC machine 100 can be of any variety typically used in an assembly operation. One such example is a conveyor system, wherein the workpiece rides along a conveyor before being picked up and then set back down by the gripper tool 114.

It should be understood that the description of the embodiment provided above is to provide a simplified explanation of the present invention. Accordingly, several components associated with the invention were defined in a simple form. It is considered apparent that one skilled in the art would recognize variations and modifications which are considered to be in the scope of the present invention. Specifically, while the present invention is described as utilizing a drill tool 112, any rotary tool could be substituted for the drill tool.

Further, there are many different kinds of CNC machines amenable for use with the present invention. While a vertical CNC machine has been described, the invention is also amenable for use with a horizontal CNC machine by moving the location of the components. Further, CNC machines commonly have part mounting blocks mounted on movable tables. The tables are adapted to move along fourth and/or fifth axes. This motion facilitates the repositioning of the workpiece.

What is claimed is:

1. A Computer Numerical Control (CNC) machine, comprising:
    a spindle disposed within a work envelope of the CNC machine, the spindle configured to releasably operably clamp a machining tool and to generate a rotational motion; and
    a gripper tool configured to be releasably operably attached to the spindle as an alternative to the machining tool, the gripper tool having moveable claws and being configured to translate the rotational motion generated by the spindle into an opening and closing of the claws,
    wherein the gripper tool comprises:
    an attachment portion configured to be attached to and rotated by the spindle;
    a driving portion attached to the attachment portion so as to be integrally rotatable therewith;
    a non-rotary translational portion operably engaged with the attachment and driving portions so as to translate the rotation of the attachment and driving portions into linear motion, the non-rotary translational portion comprising a housing having a threaded opening defined therein, an adapter attached to and extending from the housing, and a piston attached to and extending from the adapter, wherein the driving portion includes a threaded rod threadably received in the housing threaded opening; and
    a gripper portion including the claws, the gripper portion being attached to the non-rotary translational portion so as to utilize the linear motion of the non-rotary translational portion to open and close the claws.

2. The CNC machine according to claim 1, wherein
    rotation of the driving portion threaded rod causes the housing to move vertically on the threaded rod along the housing threaded opening, the vertical motion of the housing causing the attached adapter and piston to similarly move in a vertical direction, and
    a distal end of the piston is attached to the gripper portion.

3. The CNC machine according to claim 2, wherein the gripper tool includes two symmetrical arms which are each connected at one end to a pivot pin, and drivingly engage the piston at the pivot pin connected end, said driving engagement with the piston being made such that when the piston moves downwardly, the claws move toward one another and, when the piston moves upwardly, the claws move away from one another.

4. The CNC machine according to claim 3, wherein the arms are generally L-shaped.

5. The CNC machine according to claim 1, further comprising:
    an automatic tool changer configured to attach the gripper tool to the spindle and to detach the gripper tool from the spindle.

6. The CNC machine according to claim 5, wherein the automatic tool changer comprises:

a vertically-oriented pivot post;

a horizontally-oriented rotating leg rotatably attached to the pivot post; and an arm configured to grip the gripper tool and provided on a distal end of the horizontally-oriented rotating leg spaced from the pivot post.

7. The CNC machine according to claim 6, wherein the automatic tool changer further comprises a changer motor configured to move the rotating leg in a vertical direction along the pivot post, as well as to rotate the rotating leg about the pivot post.

8. The CNC machine according to claim 1, further comprising the machining tool, said machining tool configured to be releasably operably attached to the spindle and to translate the rotational motion generated by the spindle to perform a work function.

9. The CNC machine according to claim 8, further comprising:

an automatic tool changer configured to attach the gripper tool and the machining tool to the spindle and to detach the gripper tool and the machining tool from the spindle.

10. The CNC machine according to claim 9, wherein the spindle is configured to attach to one of the gripper tool and the machining tool at a time, and the automatic tool changer is configured to hold at least one of the gripper tool and the machining tool at a time.

11. The CNC machine according to claim 9, wherein the automatic tool changer comprises:

a vertically-oriented pivot post;

a horizontally-oriented rotating leg rotatably attached to the pivot post;

a first arm configured to grip the gripper tool provided on a first distal end of the rotating leg spaced from the pivot post; and a second arm configured to grip the work tool provided on a second distal end of the rotating leg spaced from the pivot post and opposite to the first distal end.

12. The CNC machine according to claim 11, wherein the automatic tool changer further comprises a changer motor configured to move the rotating leg in a vertical direction along the pivot post, as well as to rotate the rotating leg about the pivot post.

13. The CNC machine according to 9, further comprising a controller configured to control the spindle and the automatic tool changer, wherein the controller is configured to control the automatic tool changer to attach and detach one of the gripper tool and the work tool to the spindle, and to control the spindle to move in X, Y, and Z directions while causing the spindle to generate the rotational motion.

14. The CNC machine according to claim 8, wherein the machining tool is a drill tool and the work function is drilling, wherein the drill tool is configured to operably engage the spindle so as to rotate a drill from the rotational motion generated by the spindle.

15. The CNC machine according to claim 1, wherein the spindle is movable in X, Y, and Z directions.

* * * * *